United States Patent [19]

Sato

[11] 4,172,177
[45] Oct. 23, 1979

[54] WATER INSOLUBLE HYDROPHILIC POLYMER COMPOSITION

[75] Inventor: Bunya Sato, Nakajo, Japan

[73] Assignee: Kyowa Gas Chemical Industry Co., Ltd., Tokyo, Japan

[21] Appl. No.: 860,248

[22] Filed: Dec. 13, 1977

Related U.S. Application Data

[63] Continuation-in-part of Ser. No. 826,254, Aug. 19, 1977, abandoned, which is a continuation of Ser. No. 694,940, Jun. 11, 1976, abandoned.

[30] Foreign Application Priority Data

| | | |
|---|---|---|
| Jun. 17, 1975 [JP] | Japan | 50-72716 |
| Sep. 16, 1976 [JP] | Japan | 51-109869 |
| Sep. 16, 1976 [JP] | Japan | 51-109870 |
| Dec. 15, 1976 [JP] | Japan | 51-150434 |

[51] Int. Cl.² ............ C08L 63/04; C08L 63/02; C08L 63/10; C08K 3/10
[52] U.S. Cl. ............ 428/413; 106/15.05; 260/29.2 EP; 260/29.6 TA; 260/42.28; 526/271; 526/304; 526/312; 428/417; 428/418; 428/442; 428/907; 525/113; 525/119; 525/328; 525/329; 525/377; 525/379; 525/382
[58] Field of Search ........... 260/836, 837 R, 42.28; 106/15 AF, 15 R; 526/312, 304, 271; 428/907, 413, 417, 418, 442

[56] References Cited

U.S. PATENT DOCUMENTS

| | | | |
|---|---|---|---|
| 3,264,370 | 8/1966 | Ott et al. | 526/55 |
| 3,707,516 | 12/1972 | Walus | 260/837 |
| 3,776,892 | 12/1973 | Bleyle | 526/312 |
| 3,790,533 | 2/1974 | Samour | 526/312 |
| 3,801,534 | 4/1974 | Beers | 106/15 AF |
| 3,813,447 | 5/1974 | Tanaka et al. | 526/304 |
| 3,853,822 | 12/1974 | Brod et al. | 260/77.5 CR |
| 3,861,949 | 1/1975 | Onozuka et al. | 106/15 AF |
| 3,889,025 | 6/1975 | Petterson | 106/15 AF |
| 3,943,187 | 3/1976 | Wu | 260/837 R |
| 3,969,300 | 7/1976 | Nagata et al. | 260/837 R |
| 3,976,615 | 8/1976 | Sekmakas | 260/837 |
| 3,979,354 | 9/1976 | Dyckman et al. | 106/15 R |
| 4,021,392 | 5/1977 | Milne et al. | 106/15 R |
| 4,025,693 | 5/1977 | Milne | 106/15 R |
| 4,129,610 | 12/1978 | Koyayashi et al. | 428/907 X |

*Primary Examiner*—Herbert J. Lilling
*Attorney, Agent, or Firm*—Armstrong, Nikaido, Marmelstein & Kubovcik

[57] ABSTRACT

A water-insoluble hydrophilic polymer composition capable of crosslinking at ambient temperature. The composition contains (A) a water-insoluble hydrophilic copolymer prepared by copolymerizing (a) at least one carboxyl group containing ethylenically unsaturated monomer selected from acrylic acid, methacrylic acid, maleic anhydride, fumaric acid, itaconic acid and citraconic acid, (b) at least one amino group containing ethylenically unsaturated monomer of the formula:

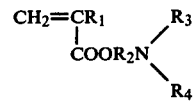

where $R_1$–$R_4$ are specifically defined, and (c) an ethylenically unsaturated monomer selected from (i) a monomer of the formula:

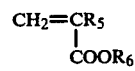

($R_6$ being alkyl), (ii) a monomer of the formula:

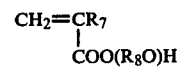

and (iii) diacetone acrylamide, and (B) a polyepoxide crosslinking agent having at least two terminal epoxy groups. The water absorption rate of the polymer can be adjusted over a wide range and has sufficient coating strength and bonding strength to withstand long periods of immersion in water.

13 Claims, No Drawings

WATER INSOLUBLE HYDROPHILIC POLYMER COMPOSITION

This application is a continuation-in-part application of application Ser. No. 826,254, filed Aug. 19, 1977, which, in turn, is a continuation of application Ser. No. 694,940, filed June 11, 1976, both now abandoned.

BACKGROUND OF THE INVENTION

1. Field of the Invention

The present invention relates to a water-insoluble hydrophilic polymer composition and, more specifically, to a water-insoluble hydrophilic polymer composition of a polymer having tertiary amino groups and carboxyl groups and an epoxy compound, and which is capable of crosslinking at ambient temperature to provide a polymer having water absorption rate adjustable over a wide range and which is highly water-proof to provide an excellent coating strength in water.

2. Description of the Prior Art

Since water-insoluble hydrophilic resin compositions are both water-absorptive and water-proof, a wide variety of applications have been developed for them such as anti-fogging coating compositions and materials for various medical appliances, a noticeable application among which is their use for coating underwater structures. It is disclosed, for example, in U.S. Pat. No. 3,896,753 and U.S. Pat. No. 3,575,123 that the fluid resistance of a vessel can be reduced by coating its bottom with a water-insoluble hydrophilic polymer. Similar disclosures are found also in U.S. Pat. No. 3,515,370 and U.S. Pat. No. 3,635,756.

While conventional water-insoluble hydrophilic resin compositions are both water-absorptive and water-proof, they have a drawback in that an increase in water absorption is inevitably accompanied by a reduction in water resistance and vice versa. Although known polymers of 2-hydroxyethyl methacrylate have a water absorption capacity of 60–70% (weight % based on the dry weight of the polymer and hereinafter referred to as D.B.%) and excellent water-proof properties and, hence, have been put to various practical uses, they do not have practical utility as a coating composition for underwater constructions at the present time. The reason for this is that when applied as a coating to the bottom of a vessel requiring a high degree of waterproofing, they do not have sufficient coating strength to withstand water immersion and have only a poor bonding strength to the vessel body even though their effects for a resistance reduction in water can be recognized experimentally.

It has been known to insolubilize a hydrophilic polymer and further subject it to crosslinking to provide sufficient coating strength in water, but there are still some problems such as reduction in hydrophilic property caused by the crosslinking, impracticality of crosslinking conditions and the like. While the use of diacrylates or dimethacrylates such as ethyleneglycol diacrylate, ethyleneglycol dimethacrylate, propyleneglycol dimethacrylate and the like (acrylates and methacrylates are hereinafter referred to as (meth)acrylates), and that of dichromates such as ammonium dichromate, potassium dichromate and the like as crosslinking agents for polymers essentially comprising 2-hydroxyethyl methacrylate are disclosed, for example, in the above patents, they are not practical because di(meth)acrylates do not have a sufficient crosslinking effect when used in a low compounding ratio and, if used in a high compounding ratio, result in a significant reduction in water absorption and fragility in the coating film per se. The use of the dichromates requires ultra-violet rays for crosslinking which restricts crosslinking conditions in practical use and, additionally, provides a risk of environmental contamination caused by chromic substances.

U.S. Pat. No. 3,575,123 discloses a process for effecting crosslinking at ambient temperature by using a 2-component catalyst system, wherein a conventional peroxide catalyst and an amine promoter such as N,N-dimethyl aniline are used in combination. No practically satisfactory coating, however, can be obtained in view of coating strength and bonding strength in swelling.

Diisocyanates such as hexamethylene diisocyanate, methaphenylene diisocyanate and the like have excellent reactivity with hydroxyl groups which are often contained as side chains in hydrophilic polymers, but are of no practical importance as crosslinking agents for insolubilizing hydrophilic polymers to enhance the coating strength in water since they also react with polar solvents generally used as solvents for hydrophilic polymers.

Epoxy compounds generally used as crosslinking agents are also impractical since a high temperature and a long time are required for the reaction between them and the hydroxyl groups of the polymers of 2-hydroxyethyl methacrylate. While it is possible to add a catalyst for the reaction of the epoxy compounds to promote the reaction, there is no contribution to the crosslinking of the polymer containing the hydroxyl groups although the curing reaction is promoted, so that no improvement can be obtained in the coating strength in water when the polymer coating is submerged in water. Besides, the use of such catalysts cause other problems such as troubles in catalyst addition, leaching of unreacted catalyst and the like.

In view of the foregoing, no practical crosslinking methods have yet been found for polymers basically comprising 2-hydroxyethyl methacrylate. Accordingly, taking notice of epoxy compounds as general crosslinking agents, we have made a further study of polymers capable of producing a crosslinked polymer whose water absorption rate can be adjusted over a wide range and which has sufficient coating strength and bonding strength capable of withstanding longer water immersion as compared with the conventional polymers of 2-hydroxyethyl methacrylate.

It is, accordingly, an object of the present invention to provide a water-insoluble hydrophilic polymer having a water absorption rate adjustable over a wide range, and sufficient coating strength and bonding strength to withstand longer water immersion.

It is another object of the present invention to provide a water-insoluble hydrophilic polymer composition capable of crosslinking at room temperature to provide a coated article being water-absorptive and having a sufficient strength to withstand long periods of water immersion.

SUMMARY OF THE INVENTION

These objects can be attained by a water insoluble hydrophilic polymer composition according to the present invention comprising (A) a water-insoluble hydrophilic copolymer of (a) 3 to 30% by weight of at least one carboxyl group-containing ethylenically unsaturated monomer selected from the group consisting of acrylic acid, methacrylic acid, maleic anhydride, fumaric acid, itaconic acid and citraconic acid, (b) 5 to 90% by weight of at least one amino group-containing ethylenically unsaturated monomer having the general formula I:

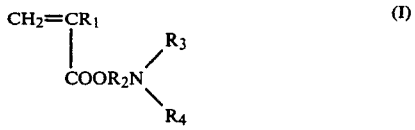

wherein $R_1$ is H or $CH_3$, $R_2$ is alkylene having 1-4 carbon atoms, and $R_3$ and $R_4$ are alkyl having 1-4 carbon atoms and (c) as the balance of 100% of the monomers, at least one ethylenically unsaturated monomer selected from the group consisting (i) a monomer having the general formula II:

wherein $R_5$ is H or $CH_3$ and $R_6$ is alkyl having 1-20 carbon atoms, (ii) a monomer having the general formula III:

wherein $R_7$ is H or $CH_3$ and $R_8$ is alkylene having 2-3 carbon atoms and (iii) diacetone acrylamide, and (B) 3 to 50% by weight, based on the weight of said copolymer, of a polyepoxide as a crosslinking agent having at least two terminal epoxy groups.

DESCRIPTION OF PREFERRED EMBODIMENTS

The carboxyl group containing ethylenically unsaturated monomer used in accordance with the present invention contributes to the present invention in that it promotes more effectively the crosslinking reaction with the epoxy compound to complete the reaction in 5-15 hours at ambient temperature. The crosslinking at ambient temperature (as compared with heat crosslinking) decreases the reduction in water absorption and facilitates the adjustment of that ratio, or capacity, by the control of the compounding amount of the epoxy compound.

The amount of the ethylenically unsaturated monomer having carboxyl groups of the copolymer should be more than 3% by weight for providing a crosslinkability at ambient temperature and less than 30% by weight for maintaining a film-forming property. Usually, the monomer can be used in a range between 3-20% by weight and, more preferably, between 8-15% by weight.

The carboxyl group-containing ethylenically unsaturated monomer is selected from the group consisting of acrylic acid, methacrylic acid, maleic anhydride, fumaric acid, itaconic acid and citraconic acid and, preferably, from acrylic or methacrylic acid.

The tertiary amino group-containing ethylenically unsaturated monomer used herein contributes much to the present invention in the following manner:

(1) tertiary amino groups contained in the polymer act not only as a catalyst for the reaction with the epoxy compound but also as crosslinking terminals, or sites, to effectively enable crosslinking to proceed and (2) since the monomer can greatly improve the water absorption to render the polymer highly water-absorptive when used in a comparatively low ratio in the copolymer, other monomers for enhancing the coating strength in water can be compounded in a higher ratio.

The compounding amount of the tertiary amino group-containing ethylenically unsaturated monomer in the copolymer should be more than 5% by weight for efficient crosslinking reaction with the epoxy compound and less than 90% by weight for sufficient coating strength in water. It is preferred to use this monomer in a ratio between 10-60% by weight and, more preferably, 20-40% by weight for attaining a high water absorption and a high coating strength for use as a coating composition for underwater structures.

The tertiary amino group-containing ethylenically unsaturated monomer used herein as a (meth)acrylate represented by the general formula:

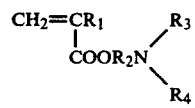

wherein $R_1$ is H or $CH_3$, $R_2$ is alkylene having 1-4, preferably, 1-2 carbon atoms, and $R_3$ and $R_4$ are alkyl having 1-4, preferably, 1-2 carbon atoms;

dimethylaminoethyl (meth)acrylate and diethylaminoethyl (meth)acrylate being most preferred.

Monomers other than the ethylenically unsaturated monomer having tertiary amino groups and the ethylenically unsaturated monomer having carboxyl groups that can be used in the present invention have no particular restrictions so long as they are copolymerizable with the above monomers, but it is desired for use with a coating for underwater structures, to select monomers that can contribute to an improvement in the coating strength in water. Such monomers are selected from the group consisting of

where $R_5$ is H or $CH_3$ and $R_6$ is alkyl having 1-20 carbon atoms;

where $R_7$ is H or $CH_3$ and $R_8$ is alkylene having 2-3 carbon atoms; and (iii) diacetone acrylamide. These include, for example, methyl (meth)acrylate, ethyl (meth)acrylate, n-propyl (meth)acrylate, isopropyl (meth)acrylate, n-butyl (meth)acrylate, sec-butyl (meth)acrylate, 2-ethylhexyl (meth)acrylate, lauryl (meth)acrylate, 2-hydroxyethyl (meth)acrylate, 2-hydroxypropyl (meth)acrylate and diacetone acrylamide.

Since the primary purpose of using such monomers is to improve the coating strength of the composition when applied to a coated object, their ratio in the copolymer can optionally be varied depending on the performances required. Preferably they are used in a range between 20-75% by weight and, more preferably, between 45-75% by weight.

The epoxy compounds used herein as the crosslinking agent are epoxy compounds having two or more terminal epoxy groups and typically include, for example, standard epoxy compounds prepared by reacting epichlorohydrin with the terminal groups of bisphenol A (such epoxy compounds are manufactured by Shell Chemical under the trade names: EPICOAT 828, EPICOAT 827, EPICOAT 1004 and EPICOAT 1009) and represented by the general formula:

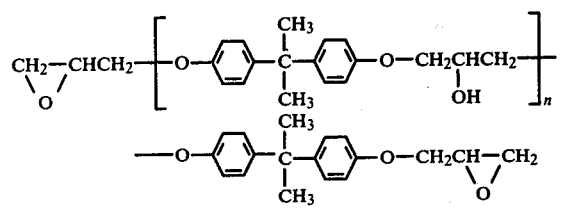

wherein n is zero or a positive integer; novolac type epoxy compounds (such as those manufactured by Shell Chemical under the trade names: EPICOAT 152, EPICOAT 154; and those manufactured by Nippon Kayaku under the trade names: EOCN 103, EOCN 104) represented by the general formula:

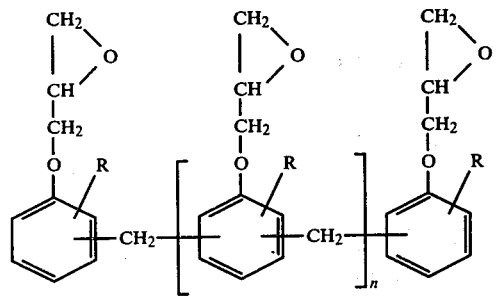

wherein
n is a positive integer and
R is H or $CH_3$;
a compound having more than two epoxide groups at the terminals (such as that amnufactured by Shell Chemical under the trade names: EPICOAT 1031 represented by the formula:

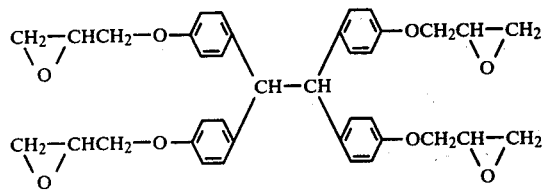

and those epoxy compounds containing chlorine atoms and soluble to hydroxyl-containing solvents (such as the epoxy compounds manufactured by Nitto Kasei under the trade names: EPONIT 012, EPONIT 028) represented by the general formula

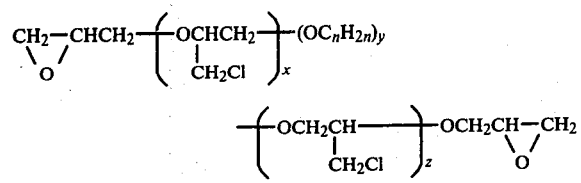

wherein x, y, z and n are positive integers. While the epoxy compound, primarily, contributes to the crosslinking of the polymer in the present invention, it also provides another effect of the present invention in that the water absorption in the resultant composition can be adjusted in accordance with the compounding ratio of the epoxy compound. Specifically, while the water absorption of the water-insoluble hydrophilic polymer according to the present invention is determined by the ratio, or amount, of the tertiary amino group-containing monomer in the copolymer, a fine adjustment of the absorption is difficult by merely changing the proportion of the tertiary amino group containing monomer in the copolymer since the absorption of the polymer is greatly increased even with a comparatively low compounding proportion of the monomer as described above. The water absorption is greatly changed by the ratio of the tertiary amino group-containing monomer in the copolymer and then finely adjusted by the compounding ratio of the epoxy compound. The compounding ratio of the epoxy compound is generally between 3-50% by weight and, particularly, for the adjustment of the water absorption, between 3-30% by weight and, more preferably, between 5-20% by weight based on the weight of copolymer.

In view of the foregoing, the present invention provides a water-insoluble hydrophilic polymer composition capable of crosslinking at ambient temperature to provide a water-insoluble hydrophilic polymer having a water absorption rate adjustable over a wide range of 10-200 D.B.% and having excellent water-proofing properties to provide high coating strength and bonding strength in water. The water-insoluble hydrophilic polymer composition satisfying the above object can be obtained by the use of (a) a copolymer containing tertiary amino groups and carboxyl groups and (b) an epoxy compound.

Optional methods can be employed for preparing the copolymer employed in the present invention such as a process for preparing high molecular substance in a casting syrup or through bulk polymerization and then dissolving of the copolymer into an appropriate solvent, solution polymerization or suspension polymerization in a solvent or the like. The polymerization is effected under the presence of a radical polymerization catalyst at a temperature usually between 50°-140° C. and, preferably, between 60°-120° C. for 1-20 hours and, preferably, 4-10 hours to prepare a copolymer having an intrinsic viscosity [$\eta$] of 0.05 to 3.0, preferably 0.08 to 2.0, and most preferably, 0.1 to 1.5, as measured using an Ostwald viscometer at a temperature of 20°-25° C. of a solution of 1 g of the copolymer dissolved in 25 ml of methyl Cellosolve.

The radical polymerization catalyst used herein includes; tert-butyl peroctoate, benzoyl peroxide, isopropyl percarbonate, methylethylketone peroxide, cumene hydroperoxide, dicumyl peroxide, azo-bis-isobutyronitrile and the like. The catalyst is used in an amount of .sually between 0.01–5.0% by weight and, preferably, 0.1–1.0% by weight based on the above monomer mixture. An appropriate range for the degree of polymerization of the copolymer is chosen based on desired film-application and film-forming properties and it can be adjusted as is conventionally known by varying the amount of the polymerization catalyst, polymerization temperature and the like.

Any solvent can be used as the solvent for polymerization so long as it uniformly dissolves the monomers and the copolymer. Preferred are lower alcohols such as methanol, ethanol, propanol, isopropanol, butanol and the like; ethyleneglycol monoalkylethers such as ethyleneglycol monomethylether, ethyleneglycol monoethylether, ethyleneglycol monopropylether, ethyleneglycol monobutylether; acetates such as Cellosolve acetate, ethyl acetate, butyl acetate; N-methylpyrrolidone and the like. A mixed solvent comprising a water-miscible organic solvent and water can also be used. In view of workability, toxicity and the like, the most preferred solvents include ethanol, propanol, isopropanol, ethyleneglycol monomethylether, ethyleneglycol monoethylether.

The polymerization solution can be used either alone or in admixture with other solvents such as aromatic and aliphatic hydrocarbons including toluene, xylene and hexane; ketones including acetone, methylethylketone, methylisobutylketone; and petrolic mineral solvents and the like if required.

The preferred monomer concentration in the polymerization solution is more than 10% by weight for practical film-forming properties and less than 50% by weight in view of the stability of the polymerization reaction and workability. Most preferably, the concentration is between 20–40% by weight.

Usually, the polymer is dissolved in an organic solvent and then mixed in this state with the epoxy compound. The epoxy compound, if it is liquid, can be mixed as it is but a solid epoxy compound is preferably dissolved in a solvent for the polymer solution or a solvent miscible therewith and then mixed with the polymer.

The solution prepared through admixture with the epoxy compound is directly applied, when used as a coating composition, on the surface of a structure to coat the same. The thickness of the film to be coated is different depending on the desired end use and usually varies between 5–100 microns, preferably, 5–30 microns and, most preferably, 10–20 microns, as the dry coating. The solution is applied to the surface of the object by way of any method such as brushing, dipping, spraying, roller application and the like.

The film thus coated cures upon drying and crosslinking. Completion of the curing is time and temperature dependent. To complete the curing within 15 hours, the temperature has to be raised above 0° C. While curing temperatures above 80° C. will cause rapid curing, they are not desirable because the water absorption of the coating is greatly reduced. For the foregoing reasons, the curing temperature is, preferably, set in a range between 0°–80° C. and, more preferably, between 5°–40° C.

The coating film obtained by curing the composition provides excellent water proofing and has a water absorption between 10–200 D.B.% (on a dry basis). The water absorption can optionally be varied within a range between 10–200 D.B.% by the selection of copolymer compositions and epoxy crosslinking agents. For the primary purpose of the present invention, that is, for coatings for underwater constructions it is, preferably, more than 10 D.B.% in view of coating strength. The water absorption is, more preferably, between 40–100 D.B.%.

The coating according to the present invention exhibits, as compared with conventional coatings for use with underwater constructions, a more excellent bonding strength with respect to bonding to an anti-fouling coating applied to a surface protected by a corrosion-resistant top coating, as well as to an unsaturated polyester resin-glass fiber laminate. The characteristic features of the coating composition according to the present invention of high water absorption, excellent waterproof properties and high coating strength in water, and satisfactory bonding strength are highly advantageous when used as a coating for underwater consructions, particularly, when used for coating the bottom of a vessel.

When the coating of the present invention is applied as a coating to the bottom of a vessel coated with an anti-fouling coating (A/F film), a long-lasting effect of the A/F film is observed. This is due to the control of the amount of Cu ions lost by leaching from the A/F film during running of the vessel. For the above purpose, it is particularly desired to adjust the water absorption of the coating film according to the present invention in a range between 40–100 D.B.%. Additionally, by the application of the coating according to the present invention to the bottom of a vessel, it is expected that the fluid resistance of the vessel in water can be reduced to increase speed and fuel saving. It has indeed been confirmed experimentally that the torque of a rotational disc in water can be decreased when the coating accordance to the present invention is applied thereto.

In addition to being applied as a coating over an A/F film, an anti-fouling coating may be prepared by compounding a conventional organic or inorganic anti-fouling agent into the polymer of the present invention.

Such anti-fouling agents usable herein include those employed generally such as cuprous oxide, copper powder, mercuric oxide, a combination of cuprous oxide and mercuric oxide, organotin compounds, organolead compounds and the like. The anti-fouling agent is compounded in the hydrophilic polymer coating in such a way that it can be leached out when immersed in water. Amounts of the anti-fouling agent required in the coating can be varied depending on the kind of anti-fouling agents used and the degree of fouling encountered according to the particular use of the coated underwater constructions and are usually in a range between 2–200% by weight based on the solids content of the composition of the present invention but may be effective in amounts as low as 0.1% by weight.

Amoung the various types of anti-fouling agents at present, toxic substances of $Cu_2O$ and organotic compounds are preferably selected in view of marine pollution.

Addition of the anti-fouling agents to the composition according to the present invention in amounts which hinder the continuous coating formation of the hydrophilic polymer should be avoided. It will be apparent that the composition can further be modified with conventional pigments and fillers such as titanium dioxide, red lead, iron oxides, talc, aluminum silicate, acid clay, pumice, zinc oxide, calcium carbonate, aluminum powder and the like.

The feature of the present invention of enabling crosslinking at ambient temperatures makes it possible to apply coatings to objects such as vessels, for example, motor boats, passenger ships, warships and the like, as well as to stationary underwater construction such as large nets for the prevention of sea weeds and other objects to which the application of such coatings has heretofore been considered substantially impossible or time-consuming because of the requirement of heat and light for the crosslinking reaction although the coating per se is possible. The present invention is extremely advantageous for a practical standpoint in view of the above. Moreover, since the crosslinking at ambient temperature results in only a relatively low reduction in the water absorption, the polymer coating of the present invention has a high water absorption and provides a great reduction in fluid resistance of a coated object in water.

The advantageous features of the composition according to the present invention reside, as detailed above, in that coatings are provided having a high water absorption and a satisfactory water proofing property to provide an excellent coating strength in water, and which possess an excellent bonding strength to anti-fouling coatings and to unsaturated polyester resins usually applied to the surface of underwater constructions, as well as in that the crosslinking reaction can be effected thereto at an ambient temperature and in a relatively short period of time. The combination of the foregoing advantageous features can be attained for the first time according to the present invention by effecting crosslinking at ambient temperature of the specified copolymer with an epoxy compound. As a result, the composition of the present invention is greatly improved with respect to its practical utility as compared with conventional coatings for underwater structures and, particularly, as compared with those described in U.S. Pat. No. 3,575,123.

The present invention may be better understood by referring to the following examples, wherein all parts and percentages are by weight unless otherwise specified.

EXAMPLE 1

In a flask equipped with a thermometer, a stirrer and a reflux condenser there were charged 10 parts of methacrylic acid, 40 parts of dimethylaminoethyl methacrylate, 50 parts of lauryl methacrylate and 400 parts of butyl acetate. After addition of 0.5 part of azo-bis-isobutyronitrile as a catalyst, the charge was heated at 75° C. for 10 hours to obtain a syrupy solution. 100 g of the syrup was mixed with 10 l g of a solution of 20 parts of EPICOTE 1031 (Shell Chemical Co.) in 100 parts of methyl Cellosolve under stirring.

The mixture was applied to an aluminum disc of a diameter of 20 cm precoated with Ravax #2 (a marine paint containing $Cu_2O$ and chlorinated rubber, supplied by Chugoku Toryo Kabushiki Kaisha), by a brush and dried to obtain a 20 microns thick coating film. When the coated disc was rotated in water at a rate of 2,400 r.p.m., there was not observed peeling of the coating film. Further when the disc was rotated at a rate of 2,400 r.p.m., its torque was decreased about 8% compared with that of the aforesaid disc precoated with only the marine paint.

On the contrary, the aforesaid mixture was coated on the surface of a polyester film and was dried to obtain a film. It was further dried in vacuo and then the dried film was submerged in water for 5 days to determine the water absorbing capacity. The capacity determined was 80% D.B.

EXAMPLE 2

Into the same flask as used in Example 1, there were charged 20 parts of methacrylic acid, 30 parts of dimethylaminoethyl methacrylate, 20 parts of lauryl methacrylate, 30 parts of diacetone acrylamide and 300 parts of methyl Cellosolve. To the charge was then added 0.5 part of azo-bis-isobutyronitrile as a catalyst and the charge was heated at 90° C. for 10 hours to obtain a syrupy solution.

The solution was coated on the surface of a polyester film in a thickness of 0.5 mm and dried to obtain a copolymer film. It was then dried sufficiently in vacuo and subjected to determination of intrinsic viscosity $[\eta]$. The value of $[\eta]$ determined at 25° C. of a solution thereof in methyl Cellosolve was 0.15 dl/g.

100 g of the syrupy solution was mixed with 5 g of a solution of 20 parts of EOCN 103 (Nippon Kayaku Kabushiki Kaisha) in 100 parts of Cellosolve acetate under stirring. The mixture thus obtained was applied to a steel plate of 10 cm × 30 cm precoated with the marine paint as used in Example 1 by a brush and dried to obtain a 20 microns thick coating film. When the coated steel plate was left in 1 m of depth of sea for 1 year, there was observed no growth of sea organism such as barnacles, selpra, laver, etc. Water absorbing capacity determined in the same manner in Example 1 was 100% D.B.

EXAMPLE 3

Into the same flask as used in Example 1, there were charged 10 parts of acrylic acid, 20 parts of dimethylaminoethyl methyacrylate, 50 parts of butyl acrylate, 10 parts of diacetone acrylamide, 10 parts of hydroxyethyl methacrylate and 300 parts of isopropanol. To the charge was then added 0.5 part of azo-bis-isobutyronitrile as a catalyst and the charge heated at 75° C. for 10 hours to obtain a syrupy solution. 100 g of the syrupy solution was mixed with 10 g of a solution of 20 parts of EPICOAT 1004 (Shell Chemical Co.) in 100 parts of methyl Cellosolve under stirring.

The mixed solution was tested by the same manner as in Example 2 to obtain a good adhesiveness and fouling resistance.

$[\eta]$ and water absorbing capacity determined in the same manner as in Example 2 were respectively 0.18 and 50% by weight (D.B.).

EXAMPLE 4

Into the same flask as used in Example 1, there were charged 10 parts of acrylic acid, 30 parts of lauryl methacrylate, 30 parts of dimethylaminoethyl methacrylate, 30 parts of diacetone acrylamide, 200 parts of ethanol and 200 parts of ethyl Cellosolve. The charge was then added with 0.5 parts of azo-bis-isobutyronitrile as a catalyst and heated at 90° C. for 10 hours to obtain a syrupy solution. 100 g of the syrupy solution was mixed with 2 g of EPONITTO 028 (Nitto Kasei Kabushiki Kaisha) under stirring.

The mixed solution was applied to an aluminum disc of a diameter of 20 cm precoated smoothly by a brush and dried to obtain 15 microns thick coating film. When the coated discs was rotated in water at a rate of 2,400 r.p.m., there was not observed peeling of the coating film. Further the disc was rotated at a rate of 2,400 r.p.m., and its torque was decreased about 4% compared with that of the aforesaid precoated disc.

Water absorbing capacity and [$\eta$] were respectively 70% by weight (D.B.) and 0.20.

EXAMPLE 5

In 100 l of a reactor equipped with a thermometer, a stirrer, a reflux condenser and a heating jacket, there were charged 10 parts of methacrylic acid, 30 parts of dimethylaminoethyl methacrylate, 30 parts of butyl acrylate, 30 parts of hydroxyethyl methacrylate and 400 parts of ethyl Cellosolve. The charge was then added with 0.5 part of azo-bis-isobutyronitrile as a catalyst and heated at 90° C. for 10 hours to obtain a syrupy copolymer solution. 20 Parts of EPICOAT 1031 (Shell Chemical Co.) was independently dissolved in 100 parts of methyl Cellosolve to obtain a solution of a crosslinking agent.

182 Tons of a tugboat precoated with Lavax #2 as a marine paint was coated with the composition of the present invention by the following procedure: 100 parts of the copolymer solution was mixed with 10 parts of the crosslinking agent solution and a part of the outer surface of the ship bottom was coated with the mixture thus obtained. Next morning after coating the boat was launched.

After one year from the lauch, it was docked, and there was observed considerable selpra and laver in an uncoated part of the composition, but there was not observed any selpra and laver in the coated part of the composition. Without applying any treatment in the coated part in the dock, the boat was launched again, and further after one year there was not observed any organism when it was docked.

EXAMPLE 6

20 Parts of powdered $Cu_2O$ was mixed with a solution of 2 parts of EOCN 103 (Nippon Kayaku Kabushiki Kaisha) in 20 parts of ethyl Cellosolve and the mixture was stirred in a ball mill for 16 hours to obtain $Cu_2O$ dispersion.

After pretreating, an aluminum plate of 30 cm×30 cm×3 mm (thickness) was coated with Ravax #1 (anticorrosion marine paint for undercoating of Ravax #2; Chugoku Toryo Kabushiki Kaisha) to obtain a test pannel.

42 Parts of the dispersion was mixed with 50 parts of the copolymer solution obtained in Example 5 under stirring. Composition of the mixture was 10 parts of the copolymer, 2 parts of the crosslinking agent, 20 parts of $Cu_2O$ and 60 parts of ethyl Cellosolve. The test pannel was coated with the mixture by a brush and dried and then it was submerged in the sea. After submerging one year in sea, there was observed neither peeling of the coated film nor adhesion of a sea organism.

EXAMPLE 7

Into the same flask as used in Example 1, there were charged 10 parts of methacrylic acid, 20 parts of diethylaminoethyl methacrylate, 30 parts of butyl acrylate, 40 parts of lauryl methacrylate and 150 parts of methyl Cellosolve. The charge was then added with 0.5 part of azo-bis-isobutyronitrile as a catalyst and heated at 90° C. for 10 hours to obtain a highly viscous copolymer solution. [$\eta$] of the copolymer determined by the same manner as in Example 2 was 0.25. Water absorbing capacity of the copolymer determined by the same manner as in Example 1 was 30 D.B.%.

Triphenyltin chloride was independently mixed with a solution of 2 parts EOCN 103 (Nippon Kayaku Kabushiki Kaisha) as a crosslinking agent in 10 parts of ethyl Cellosolve to obtain a crosslinking agent solution. 100 Parts of the copolymer solution was mixed with 34 parts of the crosslinking agent solution under stirring. Composition of the mixture was 40 parts of the copolymer, 4 parts of the crosslinking agent, 10 parts of triphenyltin chloride and 80 parts of ethyl Cellosolve. A test panel was prepared by the same manner as in Example 6 and submerged in sea. After submerging one year, there was observed neither peeling of the coated film or adhesion of a sea organism.

EXAMPLE 8

Into the same flask as used in Example 1 there were charged parts of methacrylic acid, 50 parts of dimethylaminoethyl methacrylate, 10 parts of diacetoneacrylamide, 30 parts of lauryl methacrylate, 300 parts of methyl Cellosolve as solvent and 0.5 part of azo-bis-isobutyronitrile as catalyst, and the mixture was subjected to reaction at 75° C. for 10 hours. 100 g of the reaction mixture was added with 10 g of a solution of 20 parts of EPICOTE 1031 in 100 parts of methyl Cellosolve and, after being thoroughly stirred, it was applied to a sheet glass to form a coating film of a thickness of about 30 microns. After being completely dried by evaporation of solvent, the coating film was perfectly transparent and did not collect moisture when exposed over a water bath at 75° C. [$\eta$]=0.20.

EXAMPLE 9

To a high grade thick paper of a weight of 280 g/m$^2$ having a good thermal dimensional stability there was applied 100 parts of a solution as prepared in Example 1 and added with 10 parts of a solution of 20 parts of EPICOAT 1004 in 100 parts of methyl Cellosolve to form a coating film of a weight of 10 g solid/m$^2$, and dried at room temperature for 12 hours. The water absorbing capacity of the coating film was 80 D.B.%. Carboxymethylcellulose was then applied thereover to form a paste layer of a weight of 45 g solid/m$^2$ and dried at 150° C. for 1 minute. Over the paste layer of the sheet thus obtained there were applied five color pastes, each being prepared by kneading a reactive dye, sodium alginate and a reducing agent with water, through five photo-engraved flat screens in turn 5 times to obtain five-colored transfer paper, the reactive dyes being those as ordinary used in transfer paper. The transfer paper thus obtained was superposed on a 100% cotton knit cloth in a manner such that the printed surface of the transfer paper was in contact with the surface of the cloth. Over the back of the cloth there was layed a non-woven fabric of a moisture content of 150% and then a heat resistant water-proof paper, and the assembly was pressed at a temperature of 140° C., at 20 g/cm$^2$, for 50 seconds by means of an electrically heated presser to transfer the printed color layers to the cotton cloth. During the hot press, the color layers in the transfer paper completely transferred to the cotton cloth. The printed cloth was dry heated at 150° C. for 60 seconds to fix the colors, then washed with water to remove the paste and, finally, treated with a color fixing agent, soaked in hot water at 70° to 80° C. for 15 minutes and dried in air. An apparel made out of the dyed cloth so obtained was worn for the total number of days of 30 and washed 20 times during the wearing test. The colored pattern on the cloth withstood the test without any change.

EXAMPLE 10

Into the same flask as used in Example 1 there were charged 10 parts of methacrylic acid, 40 parts of dimethylaminoethyl methacrylate, 20 parts of diacetoneacrylamide, 30 parts of butyl acrylate and 300 parts of methyl Cellosolve as solvent. The mixture was then added with 0.5 part of azo-bis-isobutyronitrile as catalyst and subjected to reaction at 75° C. for 10 hours. The reaction mixture was then added with 5%, based on its weight, of a 20% methyl Cellosolve solution of EPICOAT 1031 (Shell Chemical Co.) and, after being thoroughly stirred, it was applied to a 0.15 mm thick aluminum plate to form a dried coating film of a thickness of 30 microns. On the other hand, 360 parts of toluene diisocyanate was added and reacted with 400 parts of polyethyleneglycol 400 at 140° C. for 30 minutes. After cooling, the mixture was added with 260 parts of 2-hydroxyethyl methacrylate and 0.21 part of p-benzoquinone and subjected to reaction at 40° C. for 24 hours to obtain an unsaturated acrylic urethane resin (I). The resin (I) was a very viscous liquid at room temperature. A photosensitive composition prepared by mixing 50 parts of the resin (I) with 50 parts of a commercially available cellulose phthalate and 1 part of benzoin ethyl ether was uniformly applied over the coated surface of the aforesaid aluminum plate and dried to form a photosensitive layer of a thickness of about 2 microns.

On the photosensitive plate there was superposed a photo film and the assembly was set in a vacuum printing frame and exposed for 1 minute to a high pressure mercury lamp located 35 cm apart therefrom. The exposed plate was developed by means of an 1% aqueous diethanolamine solution, washed with water and dried to obtain a planographic printing plate.

The printing plate gave clear-cut printed matters of a very high dimensional preciseness on off-set printing. The printing durability of the plate was 100,000 sheets or more and it was unnecessary to strictly control the water feed compared with the conventional printing plates. $[\eta]=0.27$.

COMPARATIVE EXAMPLE 1

Into the same flask as in Example 1 there were charged 100 parts of 2-hydroxyethyl methacrylate, 400 parts of methyl Cellosolve and 0.3 part of azo-bis-isobutyronitrile, and the mixture was subjected to reaction at 75° C. for about 10 hours to obtain a syrup. The syrup was then added with 2 parts of a 20 wt.% aqueous ammonium bichromate, applied to the same disc as used in Example 1 and dried in room for about 24 hours. When the coated disc was revolved at a high speed in water, the last coat peeled off and the friction resistance rather increased by 3%. So, coating time was prolonged, i.e., a coated disc was dried in room for about 1 week under irradiation from a fluorescent light. In this case, there was obtained a resistance reduction of about 3% without any peeling-off of the coating.

Another specimen of the coating was heated for shortening of drying time. Heating at temperatures below 100° C. for about 60 minutes had little effect, while, when a specimen heated at 130° C. for 30 minutes, was subjected to tests, the coating did not peel in rotary disc test in water and the resistance reduction was 4%. In all cases the water absorbing capacity were about 40%. $[\eta]=0.4$.

COMPARATIVE EXAMPLE 2

Into the same flask as used in Example 1 there were charged 40 parts of 2-hydroxyethyl methacrylate, 60 parts of butyl acrylate, 0.5 part of azo-bis-isobutyronitrile and 300 parts of methyl Cellosolve, and the charge was subjected to reaction at 75° C. for 10 hours. The resulting syrup was added with 10%, based on the weight of the polymeric content of the syrup, of EPICOAT 1004 (Shell Chemical Co.) and applied to a disc in the same manner as in Example 1. When the coated disc was subjected to tests, the coating swelled immediately and peeled off because of incompleteness of curing, so that it was impossible to determine the resistance reduction and water absorbing capacity. $[\eta]=0.35$.

COMPARATIVE EXAMPLE 3

Into the same flask as used in Example 1 there were charged 20 parts of methacrylic acid, 20 parts of 2-hydroxyethyl methacrylate, 60 parts of butyl methacrylate, 0.5 part of azo-bis-isobutyronitrile and, as solvents, 280 parts of methyl Cellosolve and 120 parts of toluene, and the charge was subjected to reaction at 75° C. for 10 hours. The resulting syrup was added with 10%, based on the weight of polymer in the syrup, of EPICOAT 1031 (Shell Chemical Co.) and applied to a disc. The coating film was peeled off immediately when immersed in water because of imcompleteness of curing.

As is known by the Comparative Examples 2 and 3, polymer or copolymer containing no amino group in its molecule cannot react at room temperature with epoxy resin. $[\eta]=0.45$.

COMPARATIVE EXAMPLE 4

Into the same flask as used in Example 1 there were charged 10 parts of 2-hydroxyethyl methacrylate, 40 parts of dimethylaminoethyl methacrylate, 50 parts of butyl methacrylate, 0.5 part of azo-bis-isobutyronitrile and 400 parts of methyl Cellosolve and the mixture was then subjected to reaction at 75° C. for 10 hours. The resulting syrup was added with 10%, based on its polymer content, of EPICOAT 1004 and then subjected to the tests in the same manners as in Example 1. The coating swelled highly and peeled off from a substrate immediately after start of revolution of the disc. The water absorbing capacity was above 200%. $[\eta]=0.38$.

COMPARATIVE EXAMPLE 5

Into the same flask as in Example 1 there were charged 2 parts of methacrylic acid, 40 parts of dimethylaminoethyl methacrylate, 28 parts of lauryl methacrylate, 30 parts of diacetone acrylamide, 300 parts of methyl Cellosolve as a solvent and 0.5 part of azo-bis-isobutyronitrile as a catalyst, and the mixture was subjected to polymerization at 75° C. for about 10 hours to obtain a homogeneous syrup. The syrup was then added with 10%, based on the weight of the polymeric content of the syrup, of EOCN 103 (Nippon Kayaku Kabushiki Kaisha) applied to a disc in the same manner as Example 1. The coating film was swollen and peeled off immediately when immersed in water. The water absorbing capacity was about 60%. $[\eta]=0.25$.

COMPARATIVE EXAMPLE 6

Into the same flask as in Example 1, there were charged 35 parts of methacrylic acid, 50 parts of dimethylaminoethyl methacrylate, 15 parts of lauryl methacrylate, 300 parts of methyl Cellosolve as a solvent and 0.5 part of azo-bis-isobutyronitrile as a catalyst, and the mixture was subjected to polymerization at 75° C. for about 8 hours. After finishing the polymerization the reaction product was cooled down to precipitate a copolymer, so about 600 parts of methyl Cellosolve was added into it to obtain a syrup liquid. The syrup was then added with 10%, based on the weight of the polymeric content of the syrup, of EOCN 103 (Nippon Kayaku Kabushiki Kaisha) and applied to a disc in the same manner as Example 1. The coating film swelled remarkably and peeled off immediately from the disc when the disc was rotated. The water absorbing capacity was more than 200%. $[\eta]=0.50$.

What is claimed is:

1. A water-insoluble hydrophilic polymer composition comprising (A) a water-insoluble hydrophilic copolymer of (a) 3 to 20% by weight of at least one carboxyl group-containing ethylenically unsaturated monomer selected from the group consist of acrylic acid, methacrylic acid, maleic anhydride, fumaric acid, itaconic acid and citraconic acid, (b) 10 to 60% by weight of at least one amino group-containing ethylenically unsaturated monomer having the general formula I:

$$\underset{\underset{COOR_2N\diagdown R_4}{\overset{\diagup R_3}{|}}}{CH_2=CR_1} \quad (I)$$

wherein
$R_1$ is H or $CH_3$,
$R_2$ is alkylene having 1–4 carbon atoms, and
$R_3$ and $R_4$ are alkyl having 1–4 carbon atoms and
(c) 20 to 75% by weight of at least one ethylenically unsaturated monomer selected from the group consisting of (i) a monomer having the general formula II:

$$\underset{\underset{COOR_6}{|}}{CH_2=CR_5} \quad (II)$$

wherein
$R_5$ is H or $CH_3$ and
$R_6$ is alkyl having 1–20 carbon atoms,
(ii) a monomer having the general formula III:

$$\underset{\underset{COO(R_8O)H}{|}}{CH_2=CR_7} \quad (III)$$

wherein
$R_7$ is H or $CH_3$ and
$R_8$ is alkylene having 2–3 carbon atoms,
and (iii) diacetone acrylamide, and (B) 3 to 50% by weight, based on the weight of said copolymer, of a polyepoxide, as a crosslinking agent, having at least two terminal epoxy groups.

2. A water-insoluble hydrophilic composition according to claim 1, wherein the monomer (b) has the general formula:

$$\underset{\underset{COOR_2N\diagdown R_4}{\overset{\diagup R_3}{|}}}{CH_2=CR_1}$$

wherein
$R_1$ is H or $CH_3$,
$R_2$ is alkylene having 1–2 carbon atoms and,
$R_3$ and $R_4$ are alkyl having 1–2 carbon atoms.

3. A water-insoluble hydrophilic composition according to claim 2, wherein the monomer (a) is acrylic or methacrylic acid, the monomer (b) has the general formula:

$$\underset{\underset{COOCH_2CH_2N\diagdown R_4}{\overset{\diagup R_3}{|}}}{CH_2=CR_1}$$

wherein
$R_1$ is H or $CH_3$ and
$R_3$ and $R_4$ are alkyl having 1–2 carbon atoms,
and monomer (c) is at least one member selected from the group consisting of (i) a monomer having the general formula:

$$\underset{\underset{COOR_6}{|}}{CH_2=CR_5}$$

wherein
$R_5$ is H or $CH_3$ and
$R_6$ is alkyl having 1–12 carbon atoms,
(ii) hydroxyethyl acrylate or methacrylate and (iii) diacetone acrylamide.

4. A water-insoluble hydrophilic composition according to claim 1, comprising a hydrophilic copolymer of 3 to 20% by weight of monomer (a), 10 to 60% by weight of monomer (b) and 20 to 75% by weight of monomer (c), and 3 to 30% by weight of the polyepoxide based on the weight of said copolymer.

5. A water-insoluble hydrophilic composition according to claim 4, comprising a hydrophilic copolymer of 8 to 15% by weight of monomer (a), 10 to 60% by weight of monomer (b) and 45 to 72% by weight of monomer (c), and 5 to 20% by weight of the polyepoxide based on the weight of said copolymer.

6. A water-insoluble hydrophilic composition according to claim 2, wherein the polyepoxide is selected from the group consisting of:

$$CH_2\underset{O}{-}CHCH_2 {\Bigg (} O-\phi-\underset{\underset{CH_3}{|}}{\overset{\overset{CH_3}{|}}{C}}-\phi-O-CH_2\underset{\underset{OH}{|}}{CH}CH_2 {\Bigg )}_n \quad (1)$$

$$-O-\phi-\underset{\underset{CH_3}{|}}{\overset{\overset{CH_3}{|}}{C}}-\phi-O-CH_2CH\underset{O}{-}CH_2$$

wherein n is zero or a positive integer, (2)

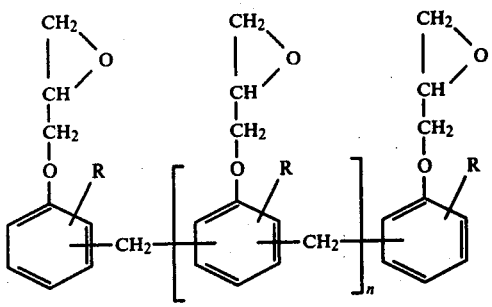

wherein
R is H or CH₃ and
n is a positive integer, (3)

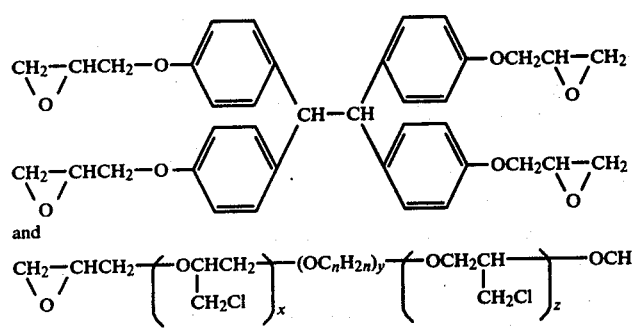

and (4)

wherein x, y, z and n are positive integers.

7. A water-insoluble hydrophilic composition according to claim 1, further comprising 2 to 200% by weight of an anti-fouling agent based on the copolymer.

8. A water-insoluble hydrophilic composition according to claim 7, wherein the anti-fouling agent is $Cu_2O$ or an organotin compound.

9. An underwater construction comprising a substrate and as a coating thereon, a water-insoluble hydrophilic composition according to claim 1.

10. An underwater construction according to claim 9, wherein the coating of the water-insoluble hydrophilic composition has 10 to 150% by weight of water absorbing capacity.

11. An underwater construction according to claim 10, wherein the coating has 40 to 100% by weight of water absorbing capacity.

12. An underwater construction comprising a substrate and as a coating thereon, a water-insoluble hydrophilic composition according to claim 7.

13. An underwater construction according to claim 12, wherein the coating has 10 to 150% by weight of water absorbing capacity.

* * * * *